United States Patent [19]

Meinhold et al.

[11] Patent Number: 4,879,188
[45] Date of Patent: Nov. 7, 1989

[54] BYPASS ELEMENT FOR SAFEGUARDING BATTERY CELLS

[75] Inventors: Henner Meinhold, Sandhausen; Botho Ziegenbein, Neckarsteinach; Gunther Petri, Sandhausen, all of Fed. Rep. of Germany

[73] Assignee: BBC Brown Boveri Aktiengesellschaft, Mannheim, Fed. Rep. of Germany

[21] Appl. No.: 213,527

[22] Filed: Jun. 30, 1988

[30] Foreign Application Priority Data

Jul. 1, 1987 [DE] Fed. Rep. of Germany ....... 3721754

[51] Int. Cl.$^4$ .................. H07M 14/00; H02J 7/00
[52] U.S. Cl. ........................ 429/7; 429/103; 320/39
[58] Field of Search ............... 429/7, 103; 320/39

[56] References Cited

U.S. PATENT DOCUMENTS

| 4,143,212 | 3/1979 | Ueno et al. | 429/7 |
|---|---|---|---|
| 4,452,867 | 6/1984 | Conforti | 429/7 |
| 4,496,448 | 1/1985 | Tai et al. | 204/192.32 |
| 4,595,838 | 6/1986 | Kerschgens | 250/504 H |
| 4,705,322 | 11/1987 | Yiannoulos | 357/13 X |

FOREIGN PATENT DOCUMENTS 2819584 11/1979 Fed. Rep. of Germany.
3542838 6/1987 Fed. Rep. of Germany.
479573 3/1953 Italy.

Primary Examiner—Stephen J. Kalafut
Attorney, Agent, or Firm—Herbert L. Lerner; Laurence A. Greenberg

[57] ABSTRACT

The bypass element is connected in parallel with a single battery cell or a group of battery cells of a high-temperature storage battery including a plurality of series-connected electrochemical battery cells and is used both for balancing the charging state of undamaged battery cells and for the irreversible bypassing of destroyed cells which have failed with high impedance. The bypass element includes two series-connected semiconductor components, in particular semiconductor diodes, varistors or NTC resistances in each case having a different current/voltage characteristic or curve. In the event of potentiostatic overcharging of a battery cell, the first semiconductor component goes to low impedance so that the current flow necessary for charging further battery cells is determined only by the leakage current of the second semiconductor component. If a destroyed battery cell fails with high impedance, both semiconductor components break down and irreversibly short-circuit the cell with a low impedance.

7 Claims, 3 Drawing Sheets

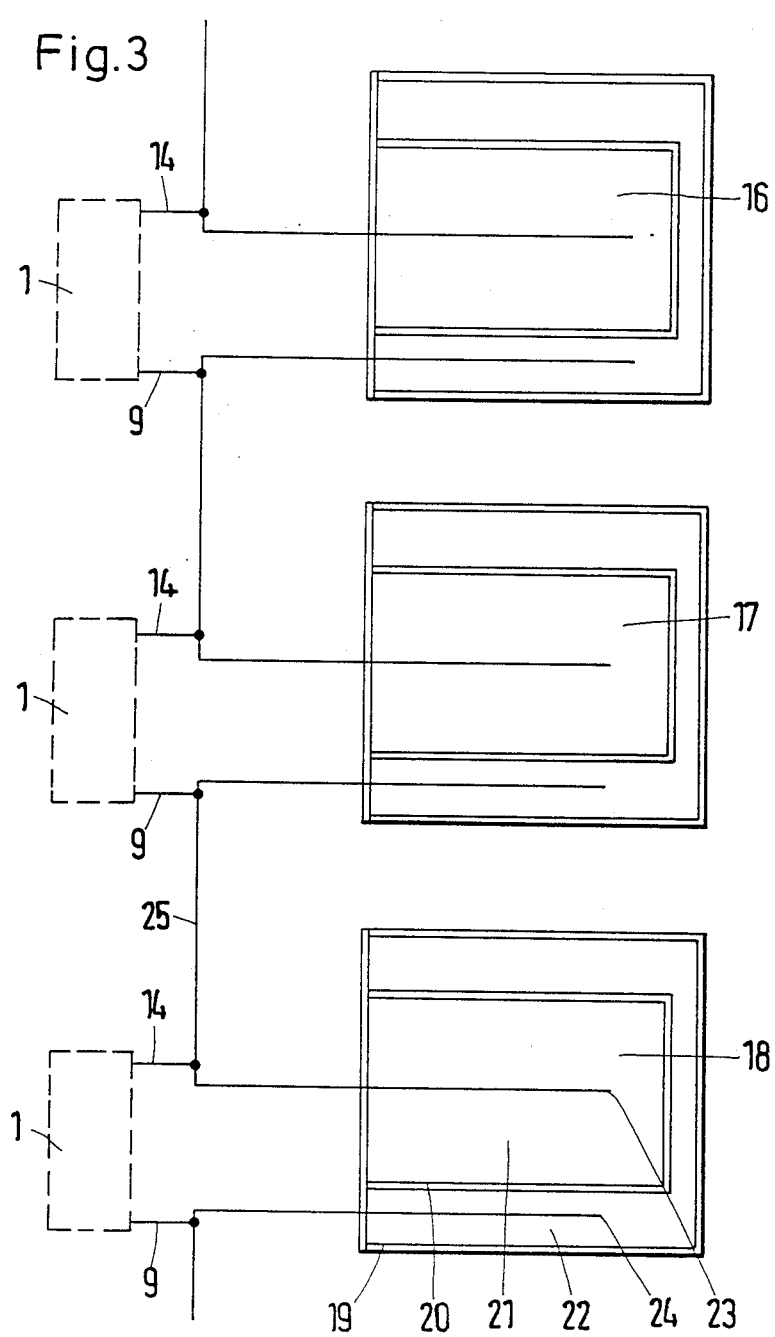

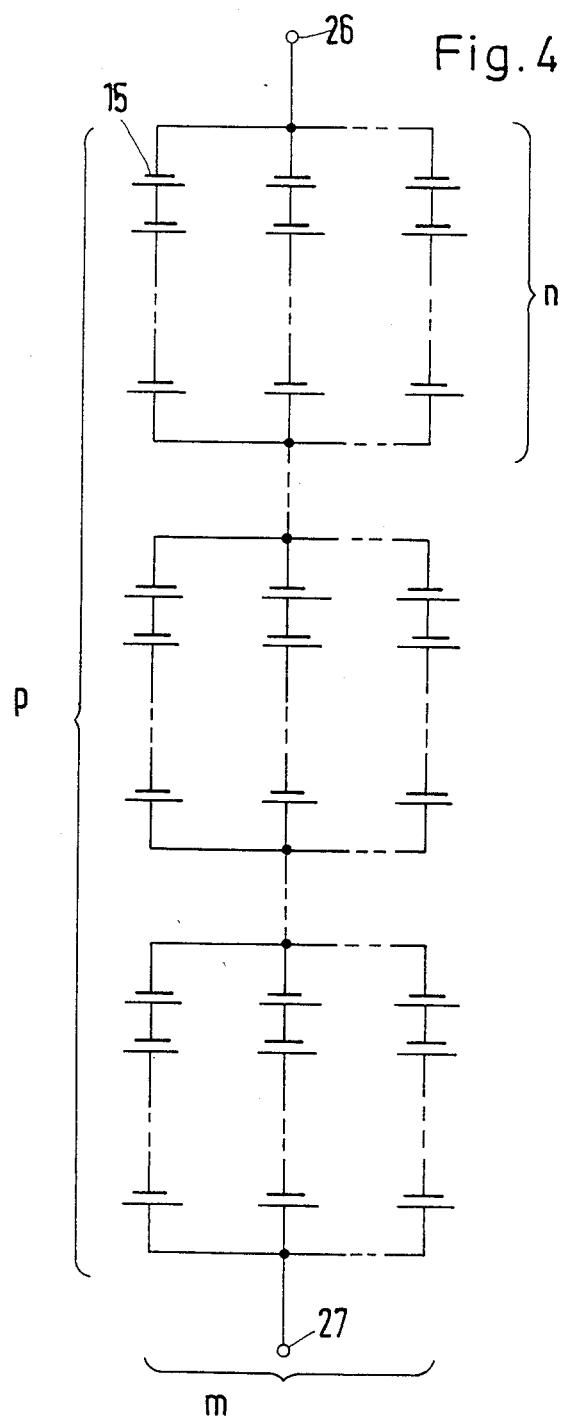

BYPASS ELEMENT FOR SAFEGUARDING BATTERY CELLS

The invention relates to a bypass element for safeguarding electrochemical battery cells or groups of several parallel-connected battery cells based on alkali metal, chalcogen and an alkali ion-conducting solid electrolyte, which are connected together in series to form a battery, at least one bypass element being connected in parallel with each respective series-connected battery cell or each respective group of battery cells, the bypass element bypassing the circuit of the cell when a predeterminable minimum charging capacity of the battery cells is reached. The bypass element is preferably used in high-temperature storage batteries assembled from rechargeable electrochemical storage cells.

Such a bypass element for safeguarding battery cells is known from German Pat. No. DE-PS 28 19 584. In that publication, the advantages and disadvantages of rechargeable electrochemical battery cells having solid electrolytes are explained. In contrast to a lead accumulator, an advantage of an electrolyte of $\beta$ aluminum oxide which is used, for example, in sodium sulphur storage cells, is that virtually no self-discharging occurs and that during charging no secondary reactions take place such as, for example, a water decomposition in a lead lead oxide system. These advantages are countered by the operating disadvantage that such cells can be neither overcharged nor discharged as is possible in the lead accumulator.

For this reason, the total capacity of a series circuit is determined by the cell having the lowest capacity without using bypassing means. A particularly serious problem is that storage cells which are used, for example, with different charging states can never be synchronized with the remaining string. In the lead accumulator, it is possible to place all of the cells into the same state by overcharging-with hydrogen/oxygen development (compensating charge).

In order to counteract this different charging of the storage cells of a battery, several storage cells can first be connected in parallel before several such groups of parallel-connected cells are connected in series. The result is that, due to compensating currents, the same charging state occurs in all cells within a group including several parallel-connected cells.

However, a fundamental improvement of the charging state of a battery can also not be achieved in this manner without using bypassing means, since the parallel block having the lowest capacity continues to determine the total capacity of the battery and the charging states of various blocks cannot be compensated. Therefore, German Patent No. DE-PS 29 19 584 proposes a circuit bypassing the battery cell (n) for safeguarding storage cells, which enables each storage cell to be completely charged up to its maximum capacity and thus serves to balance the charging state of batteries. In this configuration, a Zener diode is used which has a nominal voltage equal to the maximum charging voltage of the battery cell.

German Published, Non-Prosecuted Application No. DE-OS 35 42 838 discloses a bypass element for the irreversible short-circuiting of battery cells failing or being destroyed with a high impedance in a battery connection having several parallel and serial individual cells or cell groups. In that configuration, a semiconductor diode is used as a voltage-sensitive element for reversing the voltage across the defective battery cell. A battery cell goes to high impedance particularly when its solid electrolyte fractures.

It is accordingly an object of the invention to provide a bypass element for safeguarding battery cells, which overcomes the hereinafore-mentioned disadvantages of the heretofore-known devices of this general type and which can produce both a balancing of the charging state of undamaged battery cells and an irreversible bypassing of destroyed cells which fail with high impedance.

With the foregoing and other objects in view there is provided, in accordance with the invention, in a battery having series-connected electrochemical battery cells or groups of several parallel-connected battery cells based on alkali metal, chalcogen and an alkali ion-conducting solid electrolyte, bypass elements at least one of which being connected in parallel with each respective series-connected battery cell or with each respective group of battery cells for safeguarding the battery cells by bypassing circuits of the cells when a predeterminable maximum charging capacity of the battery cells is reached, each of the bypass elements comprising a series-connection of first and second semiconductor components assuming high-impedance and low-impedance states with different current/voltage characteristics in dependence on current or voltage, the first semiconductor component having a lower leakage current in the high-impedance state than the second semiconductor component, the second semiconductor component changing from the high-impedance to the low-impedance state at a higher voltage or higher current than the first semiconductor component, and the first semiconductor component changing from the high-impedance to the low-impedance stat exactly when a maximum charging voltage of the battery cell or of the group of battery cells is reached.

The advantages which can be achieved by means of the invention are particularly that the bypass element provides the possibility both of complete charging of all battery cells of a high-temperature storage battery and of bypassing a defective battery cell. The bypass element virtually represents a combined element for balancing and irreversible bypassing. Nevertheless, the bypass element is of very simple and space-saving construction, can be produced inexpensively and has a thermal stability which is also required with respect to the high continuous operating temperature of high-temperature batteries.

In accordance with another feature of the invention, the semiconductor components are semiconductor diodes.

In accordance with a further feature of the invention, the semiconductor components are varistors.

In accordance with an added feature of the invention, the semiconductor components are NTC resistors.

In accordance with an additional feature of the invention, there is provided a housing formed of an electrically conductive material, a fusible component disposed in the housing along with the semiconductor components, and positive and negative electrical connecting elements connected to the housing, each of the semiconductor components having first and second connecting terminals, the first connecting terminal of the first semiconductor component and the second connecting terminal of the second semiconductor component each being electrically conductively connected to a respective one of the connecting elements, and the second connecting terminal of the first semiconductor component being electrically conductively connected to the first connecting terminal of the second semiconductor component.

In accordance with yet another feature of the invention, there is provided a an electrically conducting contact element in the form of a spring electrically conductively connecting the first connecting terminal of the first semiconductor component through the housing to the respective one of the connecting elements.

In accordance with yet a further feature of the invention, there is provided a a rod-shaped internal conductor directly electrically conductively connecting the second connecting terminal of the second semiconductor component to the positive connecting element or electrically conductively connecting to second connecting terminal of the second semiconductor component through the fusible component to the positive connecting element.

In accordance with yet an added feature of the invention, there is provided a a temperature-resistant fused glass inclusion closing the housing.

In accordance with yet an additional feature of the invention, the semiconductor components are at least partially disposed in a recess formed in the fusible component.

In accordance with a concomitant feature of the invention, the two serially-connected diodes are monolithically integrated on one semiconductor chip.

Other features which are considered as characteristic for the invention are set forth in the appended claims.

Although the invention is illustrated and described herein as embodied in a bypass element for safeguarding battery cells, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 3 is a diagrammatic and schematic view of a series circuit of three battery cells with which three balancing bypass elements are connected in parallel;

FIG. 4 is a schematic circuit diagram showing the structure of a high-temperature storage battery.

Figure 1:
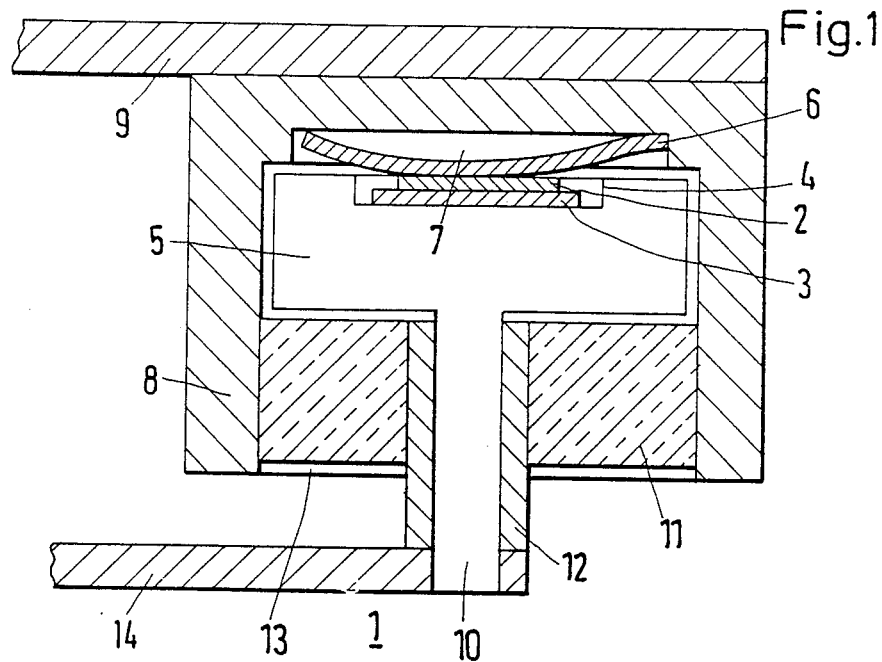
FIG. 1 is a fragmentary, diagrammatic, cross-sectional view of a balancing bypass element.

Referring now to the figures of the drawings in detail and first, particularly, to FIG. 1 thereof, there is seen a balancing bypass element 1. The bypass element 1 has two disc-shaped semiconductor components 2 and 3 which are located one above the another. Diodes are preferably used as the semiconductor components (the cathode of the component 2 and the anode of the component 3 are in contact with one another). The two semiconductor components 2, 3 are located in a recess 4 formed in a disc-shaped metallic contact disc 5 (which is preferably formed of copper), in such a way that the lower surface of the semiconductor component 3 (which is the cathode) is in contact with the contact disc 5. A metallic contact spring 6 (such as a leaf spring) presses against the top (which is the anode) of the semiconductor component 2. The contact spring 6 is supported in a recess 7 formed in a metallic housing 8. A rod-shaped negative connecting element 9 is connected to the top of the housing.

A rod-shaped internal conductor 10 protruding past the housing is integral with or formed on the contact disc 5. A glass seal or fused glass inclusion 11 and a sealing insulating sheath or sleeve 12 are located between the rod-shaped internal conductor 10 and the housing 8. The glass seal or fused glass inclusion 11 is closed off from the outside by means of an insulating disc 13. A positive connecting element 14 is placed onto the end of the rod-shaped internal conductor 10 and a negative connecting element 9 is placed onto the metallic housing 8.

Figure 2:
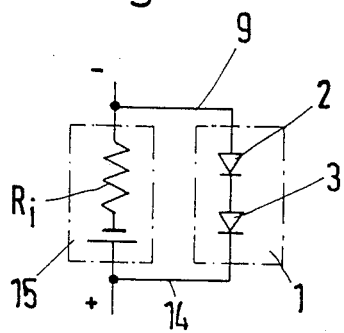
FIG. 2 is a schematic circuit diagram showing the connection of the balancing bypass element to a battery cell.

FIG. 2 shows the connection of a balancing bypass element to a battery cell, in the from of an electrochemical storage cell 15 of a high-temperature storage battery. The negative connecting element 9 of the bypass element 1 is connected to the negative pole and the positive connecting element 14 is connected to the positive pole of the battery cell 15. The bypass element 1 is shown as series-circuit of the two semiconductor components 2, 3, which are illustrated as semiconductor diodes. The internal impedance of the battery cell 15 is designated by reference symbol $R_i$. The EMF of the battery cell 15 is, for example, 2 volts.

FIG. 3 illustrates a series circuit of three battery cells (electro-chemical storage cells) with which three balancing bypass elements are connected in parallel. The battery cells 16, 17, 18 which are shown diagrammatically, belong to a non-illustrated high-temperature storage battery. Each of the battery cells 16, 17, 18 is bounded towards the outside by a metallic housing 19 within which a cup-shaped solid electrolyte 20 is disposed. This electrolyte is produced of betaaluminium oxide and separates two reactant spaces 21 and 22 from each other. The internal area of the solid electrolyte 20 is used as anode space 21 and is filled with sodium, while the cathode space 22 which contains sulphur is provided between the metallic housing 19 and the solid electrolyte 20. Current collectors 23 and 24 respectively project into the reactant spaces 21 and 22. As is shown in FIG. 3, the current collector 23 projecting into the solid electrolyte 20 of the battery cell 18 is connected through an electric conductor 25 to the current collector 24 which projects into the cathode space 22 of the adjacent battery cell 17. At the same time, the current collector 23 is connected to the positive connecting element 14 of the bypass element 1 which is connected in parallel with the next storage cell. The current collector 24 of the battery cell 18 is electrically conductively connected to the negative connecting element 9 of the bypass element 1. The bypass elements 1 which are connected in parallel with the remaining battery cells, are connected to the remaining battery cells in a corresponding manner.

FIG. 4 diagrammatic illustrates the structure of a high-temperature storage battery. The battery is formed of p series-connected blocks, each block having m parallel branches which in each case is formed of of n series-connected battery cells. The external connecting poles of the battery are designated by reference numerals 26, 27. Following the description of the construction of a bypass element, the construction of a high-temperature storage battery and the connection of a battery cell to a bypass element, the operation of a bypass element will be explained as follows. For this purpose, reference is made to FIG. 5.

Figure 5:
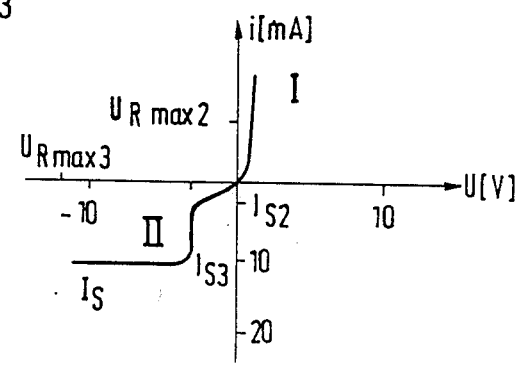
FIG. 5 is a graph showing the current/voltage characteristic of the balancing bypass element.

FIG. 5 shows the current/voltage characteristic or curve of the balancing bypass element. This characteristic is obtained by a series connection of two semiconductor components 2 and 3 in the form of diodes, each having a different breakdown voltage (reverse voltage) and each having a different leakage current (reverse current). The breakdown voltage of the first semiconductor component 2 is, for example, $U_{Rmax} = -3$ volts, the leakage current is, for example, $I_{S2} = -3$ milliamperes, the breakdown voltage of the second semiconductor component 3 is, for example, $U_{Rmax3} = -12$ volts, the leakage current is, for example, $I_{S3} = 10$ milliamperes. Quadrant I of FIG. 5 shows the branch of the characteristic or curve which applies to a defective battery cell 15 (for example having a high impedance due to a fracture of the solid electrolyte) and quadrant II shows the branch of the characteristic or curve which applies to an undamaged battery cell.

In the text which follows, quadrant II of the characteristic or curve according to FIG. 5 will be considered first, and in particular in order to explain the behavior of the bypass element 1 with potentiostatic overcharging. In order to charge the empty battery cells of the high-temperature storage battery according to FIG. 4, a current source which supplies the charging current is connected to the external connecting poles 26, 27 of the battery. The semiconductor components 2, 3 of the bypass elements located in parallel with the cells are in a blocking condition so that no current flows through the bypass elements. When the voltage of the battery cell has reached a value of, for example, 2 volts (which is the EMF of the battery cell) they are charged to their maximum capacity. Due to the charging, the cells have gone to high impedance, that is to say the current flowing through them becomes considerably less. Since the current flowing through the charged cells is very small, the consequence is that other cells which are in series with the charged cells and have not yet been completely charged to their maximum capacity are not charged further. In other words, in a series circuit without bypassing means, the cell or the group of cells having the lowest capacity determines the total capacity of all of the cells of the battery.

Complete charging of all series-connected cells or groups of parallel-connected cells is made possible by connecting the bypass elements in parallel with the battery cells. The breakdown voltage of the first semiconductor component 2 exactly corresponds to the maximum charging voltage of a cell or to the maximum charging voltage of the cells of a group. If the cell or the cells of a group have reached a voltage of, for example, $-3$ volts during the charging (potentiostatic overcharging), the first semiconductor component 2 (reverse voltage $U_{Rmax2} = -3$ volt) breaks down and the reverse current $I_{S3}$ of the second semiconductor component with $U_{Rmax3} = -12$ volts then determines the reverse current contributing to the charge compensation. In other words, the current necessary for the further charging of cells not yet exhibiting their maximum capacity then no longer flows through the battery cell which is already completely charged but only through the parallel bypass element. The circuit of the cells already charged can thus be bypassed until all of the cells of the battery are charged up to their maximum capacity. After the overvoltage across the overcharged cell has been removed, the current drops from the value of the reverse current $I_{S3}$ back to the very low value of the leakage current $I_{S2}$ of the first semiconductor component 2, that is to say the bypass element becomes free or almost free of current again.

In the text which follows, quadrant I of the characteristic or curve according to FIG. 5 is considered, that is to say the behavior of the bypass element with a high-impedance failure of a destroyed battery cell is explained. In the case of sodium/sulphur battery cells (see FIG. 3), it has been found that such a defect occurs in most cases due to the fact that the solid electrolyte becomes cracked so that the reaction substances of sodium and sulphur can react directly with one another. The battery cell then no longer produces a voltage and exhibits a large internal resistance which, in most cases, is greater by a factor of 2 than the ohmic resistance of an undamaged battery cell. The consequence of this is that only a very low or no charging or discharging current flows through the branch having the defective battery cell. If the impedance of the defective battery cell is very high, the branch in which the battery cell is disposed completely fails for the power supply. This means that the capacity of the total battery under these conditions is less by a factor of $(m-1)/m$ than that of an undamaged battery (see also FIG. 4).

If a battery cell which has been destroyed, for example, due to the fracture of its solid electrolyte, goes to high impedance, this means that the polarity of the voltage at its current collectors 23 and 24 is reversed (voltage reversal). This also results in a polarity reversal of the voltage across the electric connecting elements 9 and 14 of the respective bypass element 1. The current then no longer flows through the battery cell but is taken over by the bypass element 1. The semiconductor components 2, 3 (diodes) disposed in the bypass element 1 are connected through their connecting terminals to the connecting elements 9 and 14 in such a manner that the bypass element is polarized in the direction of conduction, that is to say a large current can flow through it. This high current results in a great temperature increase within the semiconductor components 2, 3 which leads to a break down of the semiconductor components operated in the direction of conduction so that a permanently large current path is formed through the bypass element 1. The metallic contact disc 5 is also fused so that an optimum electrically conductive contact is formed between the contact disc 5 and the semiconductor components 2, 3. The defective battery cell is irreversibly short-circuited in this manner with a low impedance and does not impede the charging and discharging of the undamaged battery cells.

Monolithic integration of the two serially-connected semiconductor components 2, 3 (diodes) in one chip is possible. Compared with a pure bypass element having only one semiconductor component, an essential advantage of the combined element is the feature that unbalances due to the stray and temperature-dependent reverse currents of only one semiconductor component (semiconductor diode) in the bypass element, are compensated.

As has already been mentioned, semiconductor diodes are preferably used as the semiconductor components 2, 3. However, varistors (variable resistors which are semiconductors having resistances that decrease with increasing voltage) and NTC resistors (negative temperature coefficient resistors which are semiconductor resistors having resistors that decrease with heating, for example due to the passage of current, such as thermistors) can also be used. Even when varistors or NTC resistors are used, it is essential that two semiconductor components having different current/voltage characteristics or curves are combined in each case to achieve a characteristic similar to that shown in FIG. 5.

We claim:

1. Bypass element for a battery having a plurality of series-connected groups of electrochemical battery cells, each group having a plurality of parallel-connected branches of battery cells based on alkali metal, chalcogen and an alkali ion-conducting solid electrolyte, the bypass element being connected in parallel with each respective battery cell or with each respective group of battery cells for safeguarding the battery cells by bypassing the cells when a predeterminable maximum charging capacity of the battery cells is reached, said bypass element comprising a series-connection of first and second semiconductor components, said components being capable of assuming a high-impedance and a low impedance state with different current/voltage characteristics in response to current or voltage applied to the cell, said first semiconductor component having a lower leakage current in the high-impedance state than said second semiconductor component, said second semiconductor component changing from the high-impedance to the low-impedance state at a higher voltage or higher current than said first semiconductor component, and said first semiconductor component changing from the high-impedance to the low-impedance state exactly when a maximum charging voltage of the battery cell or of the group of battery cells is reached, including a housing formed of an electrically conductive material, a fusible component disposed in said housing along with said semiconductor components, and positive and negative electrical connecting elements connected to said housing, each of said semiconductor components having first and second connecting terminals, the housing including an electrically conducting contact element in the form of a spring electrically conductively connecting said first connecting terminal of said first semiconductor component through said housing to said negative connecting elements of said housing, the housing further including a rod-shaped internal conductor directly electrically conductively connecting said second connecting terminal of said second semiconductor component to said positive connecting element of said housing, and said second connecting terminal of said first semiconductor component being electrically conductively connected to said first connecting terminal of said second semiconductor component.

2. Bypass element according to claim 1, wherein said semiconductor components are semiconductor diodes.

3. Bypass element according to claim 2, wherein said two serially-connected diodes are monolithically integrated on one semiconductor chip.

4. Bypass element according to claim 1, wherein said semiconductor components are varistors.

5. Bypass element according to claim 1, wherein said semiconductor components are negative temperature coefficient resistors.

6. Bypass element according to claim 1, including a temperature-resistant fused glass inclusion sealing said housing.

7. Bypass element according to claim 1, wherein said semiconductor components are at least partially disposed in a recess formed in said fusible component.

* * * * *